(12) United States Patent
Kalhous et al.

(10) Patent No.: US 8,798,809 B2
(45) Date of Patent: Aug. 5, 2014

(54) SYSTEM FOR PASSIVE ENTRY AND PASSIVE START USING NEAR FIELD COMMUNICATION

(75) Inventors: Amanda J. Kalhous, Ajax (CA); Norman J. Weigert, Whitby (CA)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/590,434

(22) Filed: Aug. 21, 2012

(65) Prior Publication Data

US 2014/0058586 A1 Feb. 27, 2014

(51) Int. Cl.
*G06F 17/00* (2006.01)

(52) U.S. Cl.
USPC .......................................................... 701/2

(58) Field of Classification Search
USPC .......................................................... 701/2
See application file for complete search history.

(56) References Cited

U.S. PATENT DOCUMENTS

| | | | |
|---|---|---|---|
| RE32,914 E * | 5/1989 | Almblad | ......................... 70/458 |
| 7,589,619 B2 | 9/2009 | DeKeuster et al. | |
| 7,629,875 B2 * | 12/2009 | Baumgartner et al. | .. 340/426.13 |
| 7,725,129 B2 | 5/2010 | Grunhold | |
| 7,990,255 B2 * | 8/2011 | Santavicca et al. | ...... 340/426.36 |
| 2008/0164988 A1 | 7/2008 | DeKeuster et al. | |
| 2010/0102943 A1 * | 4/2010 | Rutledge et al. | ......... 340/426.36 |
| 2010/0198428 A1 * | 8/2010 | Sultan et al. | ....................... 701/2 |
| 2010/0222939 A1 | 9/2010 | Namburu et al. | |
| 2010/0305779 A1 * | 12/2010 | Hassan et al. | ..................... 701/2 |

OTHER PUBLICATIONS

Related U.S. Appl. No. 13/299,786, filed Nov. 18, 2011.

* cited by examiner

*Primary Examiner* — Mary Cheung
*Assistant Examiner* — Anne Mazzara
(74) *Attorney, Agent, or Firm* — Cantor Colburn LLP

(57) ABSTRACT

A system for activating a vehicle to a key-on state by detecting a presence of a near field communication ("NFC") tag is provided. The system includes a vehicle bus, a start button in communication with the vehicle bus, an NFC antenna, and a control module. The NFC antenna is positioned to selectively couple with the NFC tag if the NFC tag is within a predetermined distance from the NFC antenna. The control module is in communication with the NFC antenna and the start button. The control module includes control logic for determining if the determining if the NFC antenna is coupled with the NFC tag. The control module includes control logic for determining if the start button has received the input to activate the vehicle to the key-on state. The control module includes control logic for sending a signal through the vehicle bus to activate the vehicle.

15 Claims, 2 Drawing Sheets

SYSTEM FOR PASSIVE ENTRY AND PASSIVE START USING NEAR FIELD COMMUNICATION

FIELD OF THE INVENTION

Exemplary embodiments of the invention relate to a system for activating a vehicle to a key-on state and, more particularly, to a system for activating the vehicle to the key-on state by detecting a mobile electronic device using near field communication ("NFC").

BACKGROUND

Many individuals own mobile electronic devices such as, for example, smartphones. Some individuals feel the need to carry their mobile electronic devices with them almost everywhere they travel. For example, some individuals carry their mobile electronic devices with them at all times of the day in an effort to interact with their business clients. Individuals are generally more likely to forget their vehicle keys (or fob device) when leaving their home or office versus their mobile electronic devices.

Passive Entry Passive Start ("PEPS") currently exist, and perform the function of unlocking the doors and starting a vehicle, without the need for a key. For example, a fob or other type of remote device may be used to unlock the doors and start the vehicle without a key. However, sometimes an individual may forget his or her fob (or vehicle keys). Accordingly, it is desirable to provide a system that would start a vehicle without the need for a key or a fob device.

SUMMARY OF THE INVENTION

In one exemplary embodiment of the invention, a system for activating a vehicle to a key-on state by detecting a presence of a near field communication ("NFC") tag is provided. The system includes a vehicle bus, a start button in communication with the vehicle bus, an NFC antenna, and a control module. The NFC antenna is positioned to selectively couple with the NFC tag if the NFC tag is within a predetermined distance from the NFC antenna. The control module is in communication with the NFC antenna and the start button. The control module includes control logic for determining if the NFC antenna is coupled with the NFC tag. The control module includes control logic for determining if the start button has received the input to activate the vehicle to the key-on state. The control module includes control logic for sending a signal through the vehicle bus to activate the vehicle to the key-on state if the NFC antenna is coupled with the NFC tag and if the start button has received input to activate the vehicle to the key-on state.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

The following description is merely exemplary in nature and is not intended to limit the present disclosure, its application or uses. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
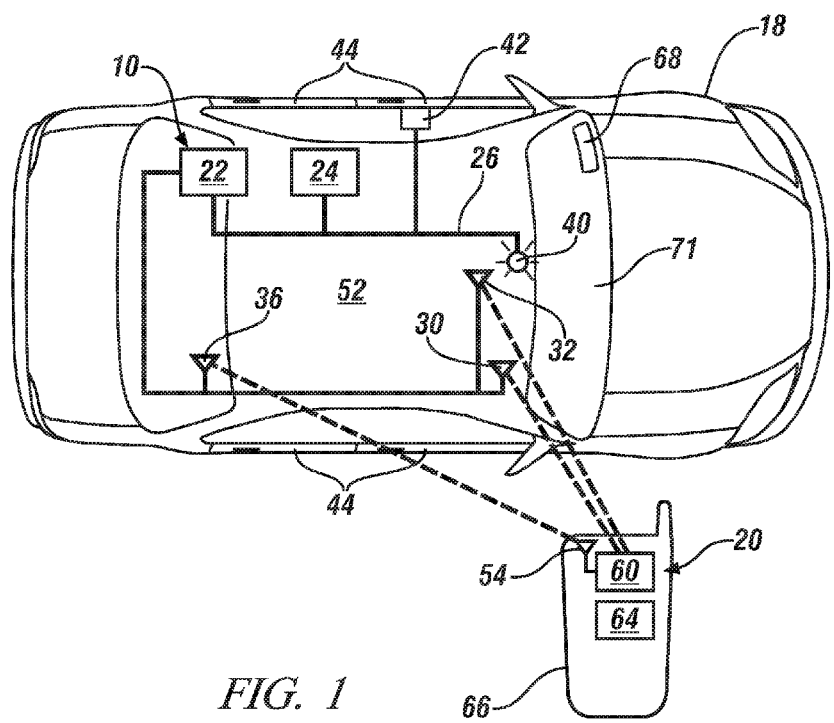
FIG. 1 is an exemplary schematic illustration of a system for activating a vehicle to a key-on state.

Referring now to FIG. 1, an exemplary embodiment is directed to a system 10 for activating a vehicle 18 to a key-on state by detecting the proximity of a mobile electronic device 20. The system 10 includes a control module 22, a door control module 24, a vehicle bus 26, a first near field communication ("NFC") antenna 30, a second NFC antenna 32, a short-range wireless antenna 36, and a vehicle activation or start button 40. In one exemplary embodiment, the control module 22 is a passive entry passive start ("PEPS") module. The start button 40 may be a push-button or twistable keyless start device configured to receive input from a user (e.g., a user pushes the start button 40) to activate the vehicle 18 to a key-on or ignition on state. In the key-on state, electrical power is supplied to an engine (not illustrated). In the key-off state, electrical power is not supplied to the engine (not illustrated).

Figure 2:
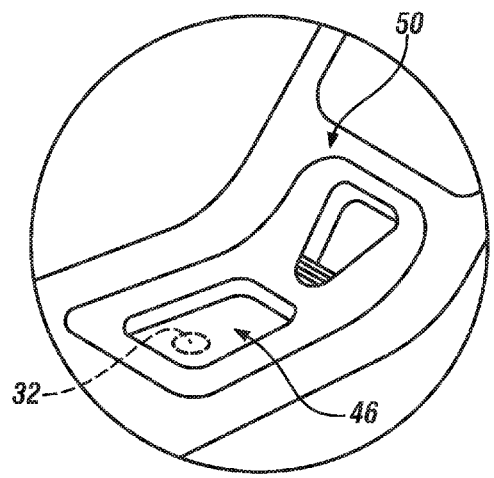
FIG. 2 is an exemplary illustration of a docking station of the vehicle shown in FIG. 1.

The door control module 24 monitors a latching system 42 of multiple vehicle doors 44 to lock and unlock one or more vehicle doors 44. The system 10 may also include a docking station 46 (shown in FIG. 2) that is configured to receive the mobile electronic device 20. Specifically, the docking station 46 may be a cradle configured to hold the mobile electronic device 20. For example, with reference to FIG. 2, in one exemplary embodiment, the docking station 46 may be located within a center console 50 of the vehicle 18, however, it is to be understood that other locations within an interior cabin 52 of the vehicle 18 may be used as well. Moreover, the docking station 46 may also be co-located with an inductive charging device (not illustrated) as well.

Turning back to FIG. 1, the mobile electronic device 20 may be any type of portable electronic device associated with or having a recognizable code such as, for example, a cellular telephone or a smartphone device. In one embodiment, the recognizable code may be the device address (e.g., a Bluetooth® device address) of the mobile electronic device 20. The mobile electronic device 20 includes an NFC tag 60 and a short-range wireless antenna 54. The short-range wireless antenna 54 is sized to send and receive RF signals that comply with a short-range wireless communications protocol for exchanging data over relatively short distances such as, for example, the Bluetooth® protocol conforming to IEEE Standard 802.15. The short-range wireless antenna 54 is in communication with a control module 64 of the mobile electronic device 20, where the control module 64 includes transceiver circuitry for communication with the short-range wireless antenna 54. Alternatively, a separate transceiver (not shown) may be provided as well.

The mobile electronic device 20 is a dual-mode device. This means that the control module 64 includes logic, circuitry, or other interfaces needed to support a low-power version of the short-range wireless communications protocol in addition to the short-range wireless communications protocol. The low-power version of the short-range wireless communications protocol generally has a power consumption of about 15 mA or less. One example of the low-power version of the short-range wireless communications protocol is the Bluetooth Smart® low energy ("BLE") protocol.

In one embodiment, the NFC tag 60 is a passive device (e.g., having no power source). Instead, the NFC tag 60 may be placed within a predetermined distance (e.g., usually about 2-4 centimeters) from the either the first NFC antenna 30 or the second NFC antenna 32 of the vehicle 18 to induce an electrical current in an integrated circuit (not shown) within the NFC tag 60 (e.g., to inductively couple the NFC tag 60 to one of the first NFC antenna 30 or the second NFC antenna 32). The electrical current is used to power the integrated circuit of the NFC tag 60, and broadcast a signal back to either the first NFC antenna 30 or the second NFC antenna 32. It should be noted that in some embodiments, the mobile electronic device 20 may not include a dedicated NFC tag 60, and instead a user applies an NFC decal or sticker (not illustrated) to an exterior surface 66 of the mobile electronic device 20. The NFC sticker includes the circuitry generally included in the NFC tag 60.

Figure 3:
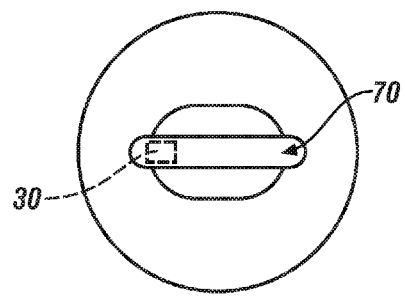
FIG. 3 is an exemplary illustration of a door handle of the vehicle shown in FIG. 1.

The first NFC antenna 30 and the second NFC antenna 32 may be embedded within various components of the vehicle 18. The first NFC antenna 30 may be embedded within a component located on an exterior surface of the vehicle 18. For example, in the embodiment as shown in FIG. 3, the first NFC antenna 30 may be located along an exterior door handle 70 of the vehicle 18 (shown in FIG. 3). Alternatively, in another embodiment, the first NFC antenna 30 may be placed within the interior cabin 52, in a location 68 along a front dash 71 adjacent to a vehicle identification number (VIN) plate (not shown).

The second NFC antenna 32 is embedded within a component located in an interior cabin 52 of the vehicle 18. For example, referring to FIG. 2, in one approach the second NFC antenna 32 may be embedded within the docking station 46 that holds the mobile electronic device 20. However, it is to be understood that the second NFC antenna 32 may be embedded within various other interior components as well such as, for example, a center console located under an arm rest (not shown). The first NFC antenna 30 and the second NFC antenna 32 are both in communication with the control module 22, where the control module 22 includes transceiver circuitry for communication with both the first NFC antenna 30 and the second NFC antenna 32. Alternatively, a separate transceiver (not shown) may be provided as well.

The short-range wireless antenna 36 of the vehicle 18 is sized to send and receive RF signals that comply with a short-range wireless communications protocol such as, for example, the Bluetooth® protocol. The short-range wireless antenna 36 is in communication with the control module 22, where the control module 22 includes transceiver circuitry for communication with the short-range wireless antenna 36. Alternatively, a separate transceiver (not shown) may be provided as well. The control module 22 also includes dual-mode functionality. Thus, the control module 22 includes logic, circuitry, or other interfaces needed to support both the low-power version of the short-range wireless communications protocol (e.g., BLE) in addition and the short-range wireless communications protocol (e.g., Bluetooth®).

As a user approaches the vehicle 18 (where the vehicle 18 is in the key-off or ignition off state) while carrying his or her mobile electronic device 20, the mobile device 20 will eventually be placed within an area of proximity to the vehicle 18 (which may be a distance ranging up to about 100 meters around the vehicle 18). The control module 22 periodically polls the area of proximity through the short-range wireless antenna 36. The mobile electronic device 20 attempts to establish connection with the control module 22 (or any other control module that has the capability to poll using the short-range wireless antenna 36) using the low-power version of the short-range wireless protocol (e.g., BLE). In the event communication between the mobile electronic device 20 and the short-range wireless antenna 36 is established, the recognizable code associated with the mobile electronic device 20 is sent over the short-range wireless connection, and to the control module 22.

Memory associated with the control module 22 may store the recognizable code of at least one mobile electronic device that has previously established short-range wireless communication (e.g., the vehicle 18 and the mobile electronic device 20 have been paired together in the past). Upon receipt of the communication from the mobile electronic device 20, the control module 22 determines if any recognizable codes stored in the control module 22 memory matches the recognizable code of the specific mobile electronic device 20 attempting to establish communication with the control module 22. If the control module 22 determines that the mobile device 20 has been paired in the past, the control module 22 may then authenticate the mobile electronic device 20. The mobile electronic device 20 and the control module 22 are now connected to one another using the low-power version of the short-range wireless protocol. The control module 22 may also send one or more control signals to the vehicle bus 26. The control signals awaken the vehicle bus 26. The control signals are then sent to the door control module 24, which instructs the latching system 42 to unlock the vehicle doors 44.

Once the user enters the interior cabin 52 of the vehicle 18, the user may set his or her mobile electronic device 20 within the docking station 46 (shown in FIG. 2), or any other interior component where the second NFC antenna 32 is embedded. Thus, the NFC tag 60 is placed within the predetermined distance from the second NFC antenna 32, thereby inducing an electrical current within the integrated circuit (not shown) of the NFC tag 60. The NFC tag 60 broadcasts a signal back to the second NFC antenna 32. The second NFC antenna 32 is in communication with the control module 22. Upon receipt of the signal from the second NFC antenna 32, the control module 22 monitors the start button 40 for a user input (e.g., a user pushes the start button 40) that actives the vehicle 18 to the key-on or an ignition on state. Once the start button 40 receives the user input, the control module 22 may send a signal to activate the vehicle 18 to the key-on or ignition on state (e.g., the control module 22 may send a signal to a body control module to activate the vehicle 18). Thus, a user may activate the vehicle 18 to the key-on state without the need for a key or a fob device.

In the event a battery (not shown) of the mobile electronic device 20 is substantially drained (i.e., the battery is dead and the mobile electronic device 20 is unpowered), access to the vehicle 18 may be established by the NFC tag 60. That is, a user may unlock the doors 44 of the vehicle 18 using the NFC tag 60. This is possible because the NFC tag 60 is a passive device, and does not need an external power source (e.g., the battery of the mobile electronic device 20). For example, a user may place the NFC tag 60 within the predetermined distance from the first NFC antenna 30 (e.g., located in the exterior door handle 70 shown in FIG. 3). An electrical current is induced within an integrated circuit (not shown) of the NFC tag 60, and the NFC tag 60 broadcasts a signal back to the first NFC antenna 30. The signal broadcast from the NFC tag 60 back to the first antenna 30 indicates the recognizable code (e.g., the Bluetooth® device address) associated with the mobile device 20.

Upon receipt of the signal, the control module 22 determines if the mobile device 20 has been paired in the past. If the mobile electronic device 20 has previously been paired with the control module 22, then the control module 22 may send one or more control signals to the vehicle bus 26. The control signals awaken the vehicle bus 26. The control signals are also sent to the door control module 24, which instructs the latching system 42 to unlock the vehicle doors 44. The user may then enter the interior cabin 52 of the vehicle 18, set his or her mobile electronic device 20 within the docking station 46, and pushes the start button 40 to activate the vehicle 18 to the key-on or an ignition on state.

Figure 4:
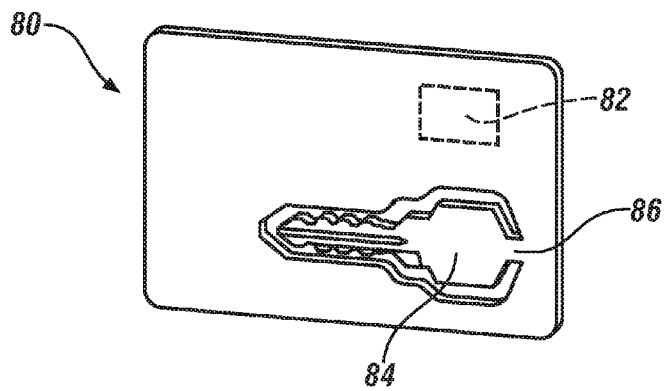
FIG. 4. is an exemplary illustration of a wallet card that is in selective communication with the vehicle as shown in FIG. 1.

In yet another embodiment, the system 10 may also include a valet or wallet card 80 (shown in FIG. 4). The wallet card 80 may be used to obtain access to the vehicle 18 by a third party (e.g., a valet). Referring to both FIGS. 1 and 4, the wallet card 80 includes an NFC tag 82 and a break-away key 84 that may be selectively removed from the wallet card 80 (i.e., a user may twist off the break-away key 84 at a base portion 86).

If the NFC tag 82 of the wallet card 80 is placed within the predetermined distance from the first NFC antenna 30 (e.g., located in the exterior door handle 70 shown in FIG. 3) an electrical current is induced within an integrated circuit (not shown) of the NFC tag 82. The NFC tag 82 broadcasts a special code back to the first NFC antenna 30. The special code indicates that the wallet card 80 is associated with the vehicle 18. For example, the special code may indicate or be associated with the specific VIN associated with the vehicle 18. Upon receipt of the special code, the control module 22 determines if the special code indicated by the wallet card 80 indicates that access to the vehicle 18 should be granted (e.g., the VIN indicated by the wallet card 80 matches the VIN associated with the vehicle 18). If the control module 22 determines access should be granted, then one or more control signals are sent to the vehicle bus 26. The control signals are also sent to the door control module 24, which instructs the latching system 42 to unlock the vehicle doors 44. The wallet card 80 is then placed within the docking station 46, and a user may activate the vehicle 18 to the key-on state by pressing the start button 40.

Alternatively, in another embodiment, the wallet card 80 may also be used to enter the vehicle 18 in the event a vehicle battery (not shown in FIG. 1) is drained, and the user does not have a set of vehicle keys (not shown) readily available. For example, if the vehicle battery is drained, a user may twist off the break-away key 84 from the wallet card 80, and use the break-away key 84 to manually unlock the vehicle doors 44. A user may then charge the vehicle battery, and activate the vehicle 18 by placing the wallet card 80 within the docking station 46 and pressing the start button 40.

In some instances, when a user places the wallet card 80 (or the mobile electronic device 20) within the docking station 46, the NFC tag 82 (or the NFC tag 60 of the mobile electronic device 20) may not be recognized by the second NFC antenna 32. This may be due to RF interference. The RF interference may be caused by various electronic devices being placed in the vicinity of the docking station 46, as users tend to place their electronic devices in the center console 50 (shown in FIG. 2). In the event the wallet card 80 or the mobile electronic device 20 is not recognized by the second NFC antenna 32, a user may be able to follow a specific procedure to activate the vehicle 18. The specific procedure is illustrated in FIG. 5.

Figure 5:
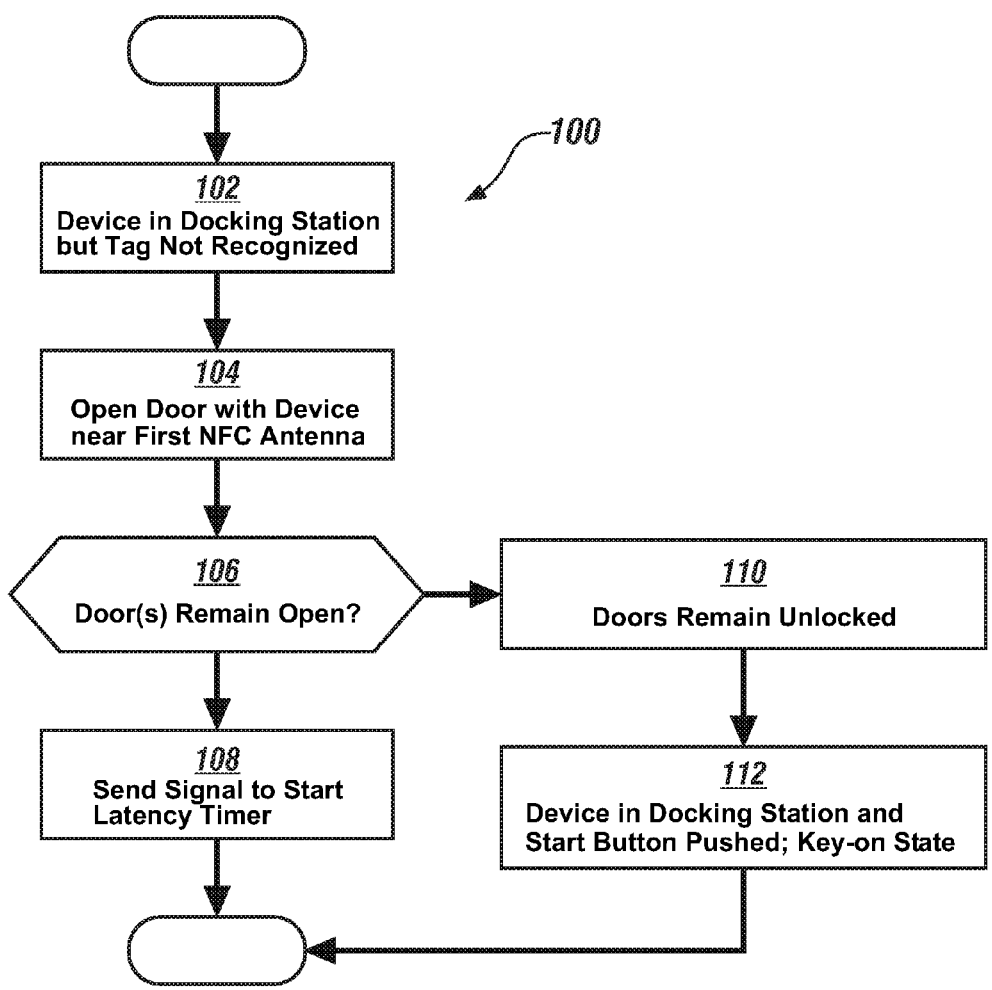
FIG. 5 is an exemplary illustration of a process flow diagram illustrating a method of entering the vehicle as shown in FIG. 1.

Turning now to both FIGS. 1 and 5, method 100 may begin at step 102, where a user may place the wallet card 80 (or mobile device 20) within the docking station 46 (shown in FIG.). However, due to RF interference, the NFC tag 82 (or the NFC tag 60 of the mobile electronic device 20) is not recognized by the second NFC antenna 32, and the user is unable to activate the vehicle 18. Method 100 may then proceed to step 104.

In step 104, the user opens one or more doors 44 of the vehicle 18, and places the wallet card 80 (or mobile device 20) within proximity of the first NFC antenna 30 (e.g., the exterior door handle 70 shown in FIG. 3). An electrical current is induced within the NFC tag 82 (or the NFC tag 60 of the mobile electronic device 20) to broadcast the signal back to the first NFC antenna 30. The signal includes the special code associated with the wallet card 80 (or the device address associated with the mobile device 20). Method 100 may then proceed to step 106.

In step 106, the door module 24 determines if one or more doors 44 of the vehicle 18 remain open (i.e., did a user close the door 44 after placing the wallet card 80 in front of the door handle 70). If one or more doors are still open, method 100 may then proceed to step 108. In step 108, a signal may be sent over the vehicle bus 26 from the door module 24 to the control module 22. Upon receipt of the signal, the control module 22 sets a latency timer. The latency timer allocates enough time for a user to re-enter the vehicle 18, set the wallet card 80 or module electronic device 20 in the docking station 46, and push the start button 40 (e.g., the latency timer may be set between about 30 to about 90 seconds. Method 100 may then terminate.

If one or more doors 44 of the vehicle are closed, method 100 may proceed to step 110. In step 110, the vehicle doors 44 remain unlocked (e.g., the user did not lock the doors 44 when last exiting the vehicle). Method 100 may then proceed to step 112.

In step 112, a user may then set the wallet card 80 or mobile electronic device 20 in the docking station 46, and push the start button 40. The vehicle 18 is activated to the key-on state. Method 100 may then terminate.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A system for interaction between a vehicle and a mobile electronic device, the system, comprising:
    a vehicle bus;
    a start button in communication with the vehicle bus, the start button configured to receive input that activates the vehicle to the key-on state;
    a door control module in communication with the vehicle bus, the door control module configured to unlock one or more doors of the vehicle in response to a door activation signal;

a vehicle short-range wireless antenna disposed on the vehicle that is configured to selectively create a short-range wireless connection with a mobile short-range wireless antenna of the mobile electronic device;

an NFC antenna that is disposed within an interior of the vehicle and is operable to selectively couple with an NFC tag of the mobile electronic device if the NFC tag is within a predetermined distance from the NFC antenna; and a control module in communication with the NFC antenna, the vehicle short-range wireless antenna, and the start button, the control module including:

a control logic for sending the door activation signal to the door control module if the short-range wireless connection is authenticated between the mobile short-range antenna and the vehicle short-range wireless antenna;

a control logic for determining if the NFC antenna is coupled with the NFC tag;

a control logic for determining if the start button has received the input to activate the vehicle to the key-on state; and a control logic for sending a signal through the vehicle bus to activate the vehicle to the key-on state if the NFC antenna is coupled with the NFC tag and if the start button has received input to activate the vehicle to the key-on state.

2. The system of claim 1, comprising a docking station that is part of the vehicle and is configured to receive the mobile electronic device, wherein the NFC antenna is located within the docking station.

3. The system of claim 1, wherein a recognizable code is associated with the mobile electronic device.

4. The system of claim 1, comprising a second NFC antenna that is part of the vehicle, wherein the second NFC antenna is in communication with the control module and located along an exterior surface of the vehicle.

5. The system of claim 4, wherein the control module sends the door activation signal to the door control module if the second NFC antenna is coupled with the NFC tag.

6. The system of claim 1, wherein the short-range wireless connection conforms to a low-power version of a short-range wireless communications protocol having a power consumption of about 15 mA.

7. The system of claim 6, wherein the short-range wireless communications protocol conforms to IEEE Standard 802.15.

8. The system of claim 1, further comprising a second NFC tag is located in a wallet card.

9. The system of claim 8, wherein a special code is associated with the wallet card, and wherein the special code indicates that the wallet card is associated with the vehicle.

10. The system of claim 9, wherein the special code indicates or is associated with the vehicle identification number ("VIN") associated with the vehicle.

11. The system of claim 1, wherein the NFC tag is a passive device with no power source.

12. A system for interaction between a vehicle and a mobile electronic device, the system, comprising:

a vehicle bus;

a start button in communication with the vehicle bus, the start button configured to receive input that activates the vehicle to the key-on state;

a door control module in communication with the vehicle bus, the door control module configured to unlock one or more doors of the vehicle in response to a door activation signal;

a vehicle short-range wireless antenna disposed on the vehicle that is configured to selectively create a short-range wireless connection with a mobile short-range wireless antenna of the mobile electronic device;

a docking station that is disposed within an interior of the vehicle and is configured to receive the mobile electronic device;

an NFC antenna that is located within the docking station and is operable to selectively couple, by induction, with an NFC tag of the mobile electronic device if the NFC tag is within a predetermined distance from the NFC antenna; and a control module in communication with the NFC antenna, the vehicle short-range wireless antenna, and the start button, the control module including:

a control logic for sending the door activation signal to the door control module if the short-range wireless connection is authenticated between the mobile short-range antenna and the vehicle short-range wireless antenna;

a control logic for determining if the start button has received the input to activate the vehicle to the key-on state; and a control logic for sending a signal through the vehicle bus to activate the vehicle to the key-on state if the NFC antenna is coupled with the NFC tag and if the start button has received input to activate the vehicle to the key-on state.

13. The system of claim 12, comprising a second NFC antenna that is part of the vehicle, wherein the second NFC is in communication with the control module and is located along an exterior surface of the vehicle.

14. The system of claim 13, wherein the control module sends the door activation signal to the door control module if the second NFC antenna is coupled with the NFC tag.

15. The system of claim 12, wherein the short-range wireless connection conforms to a low-power version of a short-range wireless communications protocol having a power consumption of about 15 mA.

* * * * *